UNITED STATES PATENT OFFICE 2,568,033

HORTICULTURAL COMPOSITION COMPRISING A POLYMERIC ORGANIC POLYSULFIDE AND A PETROLEUM OIL FRACTION

William D. Stewart, Yonkers, N. Y., assignor to The B. F. Goodrich Company, New York, N. Y., a corporation of New York No Drawing. Application April 11, 1947, Serial No. 740,967

3 Claims. (Cl. 167—22)

This invention relates to oil-containing horticultural spray compositions and more specifically pertains to synergistic adjuvants for oils and oily material which are sprayed on plants and trees for the purpose of controlling fungi and insects.

Oils and oily materials such as the various petroleum fractions, coal tar derivatives, animal oils, vegetable oils, and the fatty acids derived from animal and vegetable oils and fats have found some use as insecticides especially in the fruit orchards. These oils and oily materials are used either during the dormant period just prior to blossom bud growth or during the growing period against such insects as for example the scale insects, the concealed feeders and sucking insects as an insecticide for the adult insect as well as a larvicide and an ovicide for the earlier stages of the insect.

Elemental sulfur and sulfur in such compositions as inorganic and organic sulfides, disulfides and polysulfides are commonly employed for insecticidal and fungicidal purposes in the agriculture and horticulture fields. It is the usual practice to combine compounds which have insecticidal and fungicidal activity in a single spray composition to provide a multiple purpose spray and to reduce the amount of work required to combat the various plant pests. Some insecticides and some fungicides cannot be combined in a single spray composition because of their chemical reactivity or because their physical combination produces an undesirable phytotoxicity.

It has been reported that the use of free sulfur or sulfur in such compositions as hydrogen sulfide, mercaptans and organic sulfides and disulfides in combination with oils and oily materials resulted in serious injury to the plant foliage when used during the growing season. Practice has shown that not only can these combinations of oils with sulfur or sulfides not be used without serious foliage injury, but, if sulfur, lime-sulfur or organic sulfides are used for fungicidal or insecticidal purposes, an interval of at least two weeks after the last application of sulfur must elapse before oil can be used without considerable foliage injury. For the same reasons, a sulfur or sulfide spray composition cannot be used until at least two weeks after the application of an oil-containing spray.

I have discovered spray compositions whereby these horticultural oils and oily materials can be employed in combination with organic polysulfides without causing any undesirable injury to plant foliage. These spray compositions are conveniently and readily prepared by merely mixing these insecticidal and fungicidal oils and oily materials with an aqueous dispersion of a polymeric organic polysulfide, especially those aqueous dispersions of organic polysulfides prepared by the methods disclosed in U. S. Patent No. 2,102,564, and in my co-pending applications, Serial No. 599,316, filed June 13, 1945, now Patent No. 2,470,115, and Serial No. 599,317, filed June 13, 1945, now Patent No. 2,470,529. Although there is an appreciable amount of labile sulphur present, especially in the polysulfides containing four to five sulphur atoms per molecular unit, there is no resulting damage to the foliage when these compositions are employed. Since these polymeric organic polysulfides are effective fungicides, my compositions are able to serve a two-fold purpose by combining the biological activity of each of the components without the undesirable effects of the combination of oil and sulphur. In some cases it is also desirable to include such other insecticide compositions as for example, nicotine sulfate, lead arsenate and hydrated lime, rotenone, pyrethrins, and the like.

It is the usual practice to employ oil spray compositions containing from about 1 quart to about five parts of the oil for each 100 gallons of spray. The concentration of the oil depends in part on the purpose for which the spray is being used and in part on the degree of infestation present. To prepare spray compositions of this invention containing oil in such concentrations it is necessary to use aqueous dispersions containing only one-half pound to about 5 pounds of the polymeric organic polysulfides. The general method of preparing such oil spray compositions comprises partially diluting a quantity of an aqueous dispersion of the polymeric organic polysulfide containing the required amount of the polysulfide, adding and thoroughly mixing the amount of oil to be used and then diluting the resulting composition to 100 gallons.

The polymeric organic polysulfides with which my invention is concerned are prepared by condensing a water-soluble polysulfide such as sodium, potassium or calcium polysulfide, having from two to five or more sulphur atoms per molecule with such organic compounds as formaldehyde or those which have the graphical skeleton structural formula:

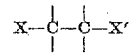

where

represents two adjacent carbon atoms or

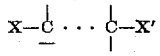

where

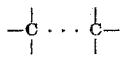

represents two carbon atoms separated by and joined to an intervening organic structure and where X and X' represent substituents which split off during the condensation reaction. The intervening structure between the pair of reactive carbon atoms in the latter group of reactive compounds may be one of the following organic linkages: a saturated straight-chain hydrocarbon radical, a saturated branch chain hydrocarbon radical, an unsaturated hydrocarbon chain radical, an ether linkage, a thio ether linkage, an organic radical containing an ether or thio ether linkage, an aromatic hydrocarbon linkage, as well as other organic radicals. The X and X' substituents which are split off by reacting with the cation of the water-soluble polysulfide can be halogen, acid sulfate, nitrate, acid phosphate, bicarbonate, formate, acetate, propionate, laurate, oleate and others.

More specifically, the organic compounds which can be employed to form the polymeric organic polysulfides are, for example, ethylene dichloride and dibromide propylene dichloride and dibromide, the dihalides of unsaturated hydrocarbon gases derived from pressure-cracking processes and natural gas-cracking processes, the sulfur dichloride reaction products of such unsaturated hydrocarbon gases, as well as disubstituted compounds of which the following are examples and where X and X' have the same significance as described above:

$$CH_3CHXOCHX'CH_3$$

A,A'-disubstituted ethyl ether $$XCH_2CH_2OCH_2CH_2X'$$

B,B'-disubstituted ethyl ether $$XCH_2OCH_2X'$$

Disubstituted methyl ether $$XC_2H_4OC_2H_4OC_2H_4X'$$

Disubstituted ethoxy ethyl ether $$XCH_2SCH_2X'$$

Disubstituted thiomethyl ether

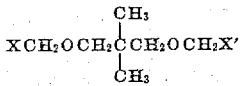

Disubstituted 1,3-methoxy 2,2-dimethyl propane $$XC_3H_6OCH_2OC_3H_6X'$$

Disubstituted dipropyl formal $$XC_2H_4OCH_2OC_2H_4X'$$

Disubstituted diethyl formal

Disubstituted para diethoxy benzene

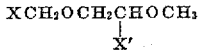

Disubstituted dimethoxy ethane

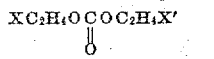

Disubstituted diethyl carbonate

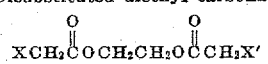

Disubstituted glycol diacetate

p,p'-Disubstituted diphenyl ether

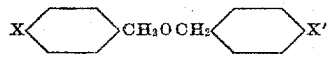

p,p'-Disubstituted dibenzyl ether $$XCH_2CH_2SO_2CH_2CH_2X'$$

Disubstituted diethyl sulfone

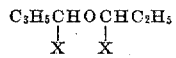

A,A'-disubstituted propyl ether

Para disubstituted benzene

Disubstituted para xylene

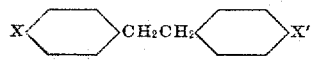

p,p'-Disubstituted dibenzyl

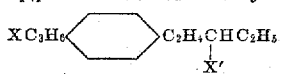

Disubstituted para hexyl benzene

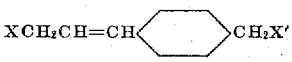

Disubstituted 3-tolyl propene-2 and compounds having more than two reactive substituents such as 1,1,2-trichlor ethane, 1,2,4-trichlor butane, 1,2,3,4-tetrachlor butane, trichlor mesitylene- and 2,2 bis(parachlorophenyl) 1,1,1-trichloroethane.

The preferred condensation products are those which are formed as stable latex-like aqueous dispersions having an average particle size of about one to ten microns, and being further characterized by being capable of forming a microscopic, translucent, discontinuous, rubbery film on drying. Aqueous dispersions having these preferred characteristics can be most readily prepared by carrying out the condensation reaction in the presence of an aqueous solution of a salt stable emulsifying or dispersing agent.

Compounds which are suitable emulsifying or dispersing agents are lignin sulfonates, alkyl benzene sulfonates having more than 20 carbon atoms in the alkyl group, aryl alkyl sulfonate, sorbitan monolaurates especially those which are oil-soluble and slightly water-soluble, casein and others. From both the economical and technical standpoints, it has been found that the lignin sulfonates, especially the sodium, potassium and calcium lignin sulfonates, are the most satisfactory emulsifying or dispersing agents for the preparation of the above-described aqueous dispersion of polymeric organic polysulfide.

The following preparations of aqueous dispersions of specific polymeric organic polysulfide are given to illustrate the preparation of the preferred types of aqueous dispersions which are useful according to my invention. The other reactants described can be employed in a like manner to produce useful spray adjuvants. The parts reported therein are by weight:

EXAMPLE I

To a mixture of an aqueous solution containing 110 parts of $(NH_4)_2S_{4.5}$ and six parts of sodium lignin sulfonate as a dispersing agent there was added slowly with vigorous stirring 70 parts of formalin (37%) while maintaining the reaction temperature at about 30° C. by external cooling. After the addition of the formalin solution had been completed, the agitation was continued for about one hour, while the temperature of the reaction mixture was maintained at about 30° C. The resulting aqueous dispersion of polymethylene polysulfide after being cooled to about room temperature is ready for use. The aqueous dispersion of the polymeric polysulfide thus prepared had an average particle size of about 1 to 4 microns, and was exceedingly stable.

EXAMPLE II

To a mixture of 480 parts of a 2-molar aqueous solution of $Na_2S_{4.5}$ and six parts of sodium lignin sulfonate as a dispersing agent there was added slowly with vigorous stirring 75 parts of ethylene dichloride while the reaction temperature was maintained at a maximum of 55° C. by external cooling. After the addition of the ethylene dichloride had been completed, the agitation was continued for about one hour while the temperature of the reaction mixture was maintained at 50 to about 55° C. The resulting aqueous dispersion had a particle size of about 1 to 4 microns, but would settle readily. The polyethylene polysulfide formed was washed three times by decantation to remove the sodium chloride formed during the condensation as a by-product. The washed polyethylene polysulfide redispersed readily to a stable latex like dispersion.

EXAMPLE III

To a mixture of 480 parts of a 2-molar aqueous solution of $Na_2S_{4.5}$ and six parts of sodium lignin sulfonate there was added slowly with vigorous stirring 110 parts of B,B'-dichlordiethylether while maintaining the reaction temperature at about 65° C. by external cooling. After the addition of the chlorinated ether had been completed, the agitation was continued for about one hour while the temperature of the reaction mixture was maintained at about 60 to 65° C. The resulting aqueous dispersion of the polymeric organic polysulfide thus prepared had an average particle size of about 1 to 4 microns. The condensation product was washed by decantation to remove the sodium chloride formed during the condensation process as in Example II. The washed product redispersed readily.

Each of the above prepared latex-like aqueous dispersions formed a microscopic, translucent, discontinuous, rubbery film when spread out in a thin layer and allowed to dry and the polymeric polysulfide could not be redispersed even with extremely vigorous rubbing in the presence of water.

The oils that can be employed in horticultural spray compositions according to my invention are those oils which are commonly used for the spraying of fruit trees and flower plants. These oils are derived from four principal sources, that is: crude petroleum, velegtable oils, animal fats, and coal tar. Of these sources, probably the most clearly defined oils are those derived from crude petroleum. The oils derived from crude petroleum vary in their use as insecticides with the variations in their physical and chemical properties. The lighter fractions which contain little or no unsaturated or unsulfonatable materials are mainly employed as insecticides and fungicides during the growing season and while the blossoms and/or fruit are on the trees. These light oil fractions can be further divided into the following three groups: First, the kerosenes, a group which have a boiling point of from 150° C. to 300° C., and a specific gravity of from .76 to .85; second, the oils referred to as light summer oils by the horticulturists, which include the petroleum fraction of from 14 to 18 carbon atoms, having a viscosity of 40 to 60 seconds Saybolt and contain 90% or more unsulfonatable residues; and third, medium summer oils which also have 14 to 18 carbon atoms and 90% or more unsulfonatable residues but have a viscosity of from 65 to 85 seconds Saybolt. The heavier petroleum fraction used as dormant sprays are those oils which have a viscosity of over 85 seconds Saybolt and usually contain some saturated and sulfonated compounds, but the presence of these materials have no deleterious effects when applied to the trees and plants in the dormant stage.

Such vegetable oils as for example castor, sesame, cotton-seed, linseed, olive, rape hempseed, coconut, soybean, palm and corn oils and such animal fats or oils as for example those derived from whales and such fishes as cod, herring, menhaden and sardine as well as such animal fats and oils as wool grease, lard and neat's-foot oil have been found to have some beneficial insecticidal activity. But, since the component fatty acids of the vegetable and animal oils and fats have a greater insecticidal value than the oil or fat from which they are derived, the fatty acids have been more extensively used. In general, the vegetable and animal oils and fats and the fatty acids derived therefrom are obtained as mixtures of esters and fatty acids and are used as such without being separated into pure or near pure compounds.

The coal tars and the numerous fractions obtained therefrom by the destructive distillation or coking of coal vary widely in their composition. These variations in composition depend not only on the type and composition of the coal used, but on the temperature and method of distillation. These coal tar derivatives have found more use as insecticides for dormant spray compositions than for spray compositions to be used during the growing season. According to the literature, the tar distillate that meets the requirements for a satisfactory dormant spray on fruit trees should be derived from tars secured from bituminous coal which has been heated to high temperatures in gas retorts or by-product coke ovens; should contain 3% or less of water; should have not more than 1% distilling at 210° C., not more than 10% distilling at 235° C. and not more than 65% distilling at 355° C.; should not contain more than 10% tar acids (less than 5% is more satisfactory); and should remain free from crystals on standing 3 hours at 5° C. with occasional stirring.

Many of the above oils and oily materials have been mixed with the aqueous dispersions of the polymeric organic polysulfides hereinbefore described and have been found to be extremely compatible without causing swelling or flocculation of the polymeric polysulfide particles.

EXAMPLE IV

The oils and oily materials used during the growing season are very seldom used alone, but are usually employed in admixture with either lead arsenate and hydrated lime or nicotine as nicotine sulphate, or a combination of all these insecticidal materials to reduce the number of sprayings and thereby reduce the cost of applying insect and fungus control compositions.

The following examples illustrate the effectiveness of my compositions over that of the compositions commonly used. The composition of each spray mixture is given for 100 gallons of spray. Those compositions containing no polymeric organic polysulfide are those generally used for codling moth control. All compositions were prepared according to the following procedures. The polymeric organic polysulfide was diluted to 100 gallons and the remaining components added. Where no polymeric polysulfide was used the materials were dispersed in the usual manner by using casein or blood albumen as dispersing agents. The examples in the following table contain abbreviations employed for the sake of simplicity. These abbreviations have the following significance:

Polyethylene polysulfide: An aqueous dispersion of polyethylene polysulfide prepared according to Example II and having a concentration of 50% of said polysulfide condensation product by weight.
Lead: Lead arsenate.
Lime: Hydrated lime.
Oil: The horticultural insecticidal oil sold under the trade name of "Ortho K Summer Oil," being a refined petroleum fraction hereinbefore described as a "light summer oil."
"Black Leaf 40": The trade name for an aqueous solution containing 40% by weight of nicotine sulphate.
"Black Leaf 155": Nicotine sulphate adsorbed on bentonite.

for example, the various roses, not only to control the insects which cause great damage to the plant, but also to control "powdery mildew" and other fungi diseases of the rose plant.

The polymeric organic polysulfide prepared in Examples I and III, the polymethylene polysulfide and the polysulfide condensation product of dichlordiethylether, as well as other polymeric organic polysulfides having a sulfur content of 2 to 4 per molecular unit have also been used in preparing horticultural oil-containing spray compositions with results equal to those indicated in the above tabulated examples. In fact any of the polymeric organic polysulfides hereinbefore defined and prepared according to the methods enumerated can be used with equal success.

It will be readily understood that the quantity of active ingredients may have to be varied to meet the special needs of controlling insects and plant disease as the conditions necessitate.

While I have disclosed specific examples of my invention, I do not thereby desire or intend to limit myself solely thereto, for, as hitherto stated, the precise proportions of the materials utilized may be varied and other insecticidal oils and combinations of insecticidal oils, insecticides, and fungicides may be employed, if desired, without departing from the spirit and scope of the invention as defined in the appended claims.

This is a continuation-in-part of my copending application, Serial No. 599,316, filed June 13, 1945, now Patent No. 2,470,115.

TABLE

Codling moth control

| Example Number | Spray Composition Basis 100 gallons | Per Cent Clean Fruit | Per Cent Wormy Fruit | Per Cent Stung Fruit | Foliage Injury |
|---|---|---|---|---|---|
| IV | 4 lbs. Polyethylene Polysulfide<br>3 lbs. Lead<br>3 lbs. Lime<br>3 qts. Oil<br>¾ pt. Black Leaf 40 | 40.7 | 13.3 | 59.2 | None |
| V | 3 lbs. Lead<br>3 lbs. Lime<br>3 qts. Oil<br>¾ pt. Black Leaf 40 | 20.7 | 19.3 | 73.7 | None |
| VI | 4 lbs. Polyethylene Polysulfide<br>3 lbs. Black Leaf 155<br>3 qts. Oil<br>¾ pt. Black Leaf 40 | 64.7 | 7.2 | 35.5 | None |
| VII | 3 lbs. Black Leaf 155<br>3 qts. Oil<br>¾ pt. Black Leaf 40 | 52.2 | 8.7 | 47.7 | None |

This data is the average of five replications.

That no foliage injury resulted from the use of the oil and polysulfide compositions of Examples IV and VI is quite unusual. For, from the results heretofore reported in the literature concerning the use of oils and organic sulfides, it would be expected that the use of the compositions of Examples IV and VI would cause serious foliage injury. Thus, by employing the compositions of this invention, it is now possible to employ a sulfide with an insecticidal oil and simultaneously obtain the beneficial biological activity of the two ingredients.

My compositions have been also exceedingly effective against apple scab and various other fungi infections in the horticultural field. Accordingly, they can be successfully employed in the orchard to control both the insect and fungi diseases. These compositions also can be successfully employed in botanical gardens for the protection of important commercial flowers as

I claim:

1. A horticultural composition comprising 1 to 5 quarts of a petroleum oil fraction for each 0.5 to 5 pounds of a polymeric organic polysulfide, the said petroleum oil fraction being one consisting mainly of saturated hydrocarbons having 14 to 18 carbon atoms, having a viscosity of from 40 to 85 seconds Saybolt and having more than 90% unsulfonatable residue, and the said polymeric organic polysulfide being one having 3 to 5 sulfur atoms per molecular unit and being in the form of solid particles of a size of no greater than 10 microns in diameter dispersed in an aqueous solution of a lignin sulfonate.

2. A horticultural composition comprising 1 to 5 quarts of a petroleum oil fraction for each 0.5 to 5 pounds of polymeric methylene polysulfide, said petroleum oil fraction being one consisting mainly of saturated hydrocarbons having 14 to 18 carbon atoms, having a viscosity of from 40 to 85 seconds Saybolt and having more than 90% unsulfonatable residue and said polymeric methylene polysulfide being one having 3 to 5 sulfur atoms per molecular unit and being in the form of solid particles of a size of no greater than 1 to 4 microns in diameter dispersed in an aqueous solution of a lignin sulfonate.

3. A horticultural composition comprising 1 to 5 quarts of a petroleum oil fraction for each 0.5 to 5 pounds of particles of polymeric ethylene polysulfide, said petroleum oil fraction being one consisting mainly of saturated hydrocarbons having 14 to 18 carbon atoms, having a viscosity of from 40 to 85 seconds Saybolt and having more than 90% unsulfonatable residue, and said polymeric ethylene polysulfide being one having 3 to 5 sulfur atoms per molecular unit and being in the form of solid particles of a size of 1 to 4 microns in diameter dispersed in an aqueous solution of a lignin sulfonate.

WILLIAM D. STEWART.

REFERENCES CITED

The following references are of record in the file of this patent:

UNITED STATES PATENTS

| Number | Name | Date |
|---|---|---|
| 2,043,941 | Williams | June 9, 1936 |
| 2,096,947 | Voorhees | Oct. 26, 1937 |
| 2,102,564 | Bonstein | Dec. 14, 1937 |
| 2,103,196 | Knight | Dec. 21, 1937 |
| 2,124,598 | Turner | July 26, 1938 |
| 2,206,643 | Patrick | July 2, 1940 |
| 2,210,420 | Lindstaedt | Aug. 6, 1940 |

---

Certificate of Correction

Patent No. 2,568,033          September 18, 1951

WILLIAM D. STEWART

It is hereby certified that error appears in the printed specification of the above numbered patent requiring correction as follows:

Column 1, line 51, for "horicultural" read *horticultural*; column 2, line 25, for "parts" read *quarts*; column 3, lines 2 to 4, for that portion of the formula reading $$X-\underline{C} \quad \text{read} \quad X-\overset{|}{\underset{|}{C}}$$

column 4, lines 11 and 12, for the formula reading $$\underset{X}{\overset{|}{C_2H_5CHOCHC_2H_5}}\underset{X}{\overset{|}{\phantom{.}}} \quad \text{read} \quad \underset{X}{\overset{|}{C_2H_5CHOCHC_2H_5}}\underset{X}{\overset{|}{\phantom{.}}}$$

and that the said Letters Patent should be read as corrected above, so that the same may conform to the record of the case in the Patent Office.

Signed and sealed this 16th day of December, A. D. 1952.

[SEAL]

JOHN A. MARZALL,
*Commissioner of Patents.*

40 to 85 seconds Saybolt and having more than 90% unsulfonatable residue and said polymeric methylene polysulfide being one having 3 to 5 sulfur atoms per molecular unit and being in the form of solid particles of a size of no greater than 1 to 4 microns in diameter dispersed in an aqueous solution of a lignin sulfonate.

3. A horticultural composition comprising 1 to 5 quarts of a petroleum oil fraction for each 0.5 to 5 pounds of particles of polymeric ethylene polysulfide, said petroleum oil fraction being one consisting mainly of saturated hydrocarbons having 14 to 18 carbon atoms, having a viscosity of from 40 to 85 seconds Saybolt and having more than 90% unsulfonatable residue, and said polymeric ethylene polysulfide being one having 3 to 5 sulfur atoms per molecular unit and being in the form of solid particles of a size of 1 to 4 microns in diameter dispersed in an aqueous solution of a lignin sulfonate.

WILLIAM D. STEWART.

REFERENCES CITED

The following references are of record in the file of this patent:

UNITED STATES PATENTS

| Number | Name | Date |
|---|---|---|
| 2,043,941 | Williams | June 9, 1936 |
| 2,096,947 | Voorhees | Oct. 26, 1937 |
| 2,102,564 | Bonstein | Dec. 14, 1937 |
| 2,103,196 | Knight | Dec. 21, 1937 |
| 2,124,598 | Turner | July 26, 1938 |
| 2,206,643 | Patrick | July 2, 1940 |
| 2,210,420 | Lindstaedt | Aug. 6, 1940 |

---

Certificate of Correction

Patent No. 2,568,033      September 18, 1951

WILLIAM D. STEWART

It is hereby certified that error appears in the printed specification of the above numbered patent requiring correction as follows:

Column 1, line 51, for "horicultural" read *horticultural*; column 2, line 25, for "parts" read *quarts*; column 3, lines 2 to 4, for that portion of the formula reading $$X-\underline{C} \quad \text{read} \quad X-C$$

column 4, lines 11 and 12, for the formula reading $$\underset{X}{C_2H_5CH}O\underset{X}{CHC_2H_5} \quad \text{read} \quad \underset{X}{C_2H_5CH}O\underset{X}{CHC_2H_5}$$

and that the said Letters Patent should be read as corrected above, so that the same may conform to the record of the case in the Patent Office.

Signed and sealed this 16th day of December, A. D. 1952.

[SEAL]

JOHN A. MARZALL,
*Commissioner of Patents.*

Certificate of Correction

Patent No. 2,568,033 September 18, 1951

WILLIAM D. STEWART

It is hereby certified that error appears in the printed specification of the above numbered patent requiring correction as follows:

Column 1, line 51, for "horicultural" read *horticultural*; column 2, line 25, for "parts" read *quarts*; column 3, lines 2 to 4, for that portion of the formula reading $$X-\overset{|}{C} \quad \text{read} \quad X-\overset{|}{\underset{|}{C}}$$

column 4, lines 11 and 12, for the formula reading $$C_2H_5CHOCHC_2H_5 \quad \text{read} \quad C_2H_5CHOCHC_2H_5$$

and that the said Letters Patent should be read as corrected above, so that the same may conform to the record of the case in the Patent Office.

Signed and sealed this 16th day of December, A. D. 1952.

[SEAL]

JOHN A. MARZALL,
*Commissioner of Patents.*